United States Patent [19]

Spittka et al.

[11] Patent Number: 4,519,829

[45] Date of Patent: May 28, 1985

[54] METHOD OF AND APPARATUS FOR QUENCH-TEMPERING SHAPED GLASS

[75] Inventors: Horst Spittka; Rudolf Eckardt; Cristoph Neuendorf, all of Wesel, Fed. Rep. of Germany

[73] Assignee: Flachglas Aktiengesellschaft, Fürth, Fed. Rep. of Germany

[21] Appl. No.: 541,683

[22] Filed: Oct. 13, 1983

[30] Foreign Application Priority Data

Oct. 14, 1982 [DE] Fed. Rep. of Germany ....... 3238043

[51] Int. Cl.$^3$ .............................................. C03B 27/04
[52] U.S. Cl. ...................................... 65/114; 65/104; 65/348; 65/351
[58] Field of Search .................. 65/114, 104, 348, 351

[56] References Cited

U.S. PATENT DOCUMENTS 3,873,294 3/1975 Goolsbay ........................... 65/114 X

FOREIGN PATENT DOCUMENTS 456522 4/1950 Italy ....................................... 65/104

Primary Examiner—Arthur Kellogg
Attorney, Agent, or Firm—Karl F. Ross; Herbert Dubno

[57] ABSTRACT

A method of quench-tempering a hot shaped glass sheet comprises supporting the sheet in a quenching station underneath a downwardly directed upper nozzle array and above an upwardly directed lower nozzle array by engagement of only a portion of the lower surface of the sheet. The portion engaged for support is interrupted by a generally uniformly distributed array of unsupported regions. An air stream is directed from the lower nozzle array up toward the lower surface of the glass sheet while an opposite air stream is directed down from the upper nozzle array toward the upper surface of the sheet. Generally all of the lower surface of the sheet is shielded except at the unsupported regions from the air stream of the lower nozzle array. A prestress field is thus formed in the sheet which corresponds to the distribution of the unsupported regions. The sheet is supported on and shielded by a plate having the same shape as the sheet but formed with holes at the unsupported regions. The sheet is transported into the station prior to quenching therein while supported on the plate and is transported out of the station after quenching therein while still supported on the plate.

5 Claims, 5 Drawing Figures

METHOD OF AND APPARATUS FOR QUENCH-TEMPERING SHAPED GLASS

FIELD OF THE INVENTION

The present invention relates to the tempering of shaped glass. More particularly this invention concerns the manufacture of tempered shaped glass as is used in automobile windows.

BACKGROUND OF THE INVENTION

As described in European patent publication No. 3,391 of H. McMaster et al, in the patent documents cited therein, in German Pat. No. 848,237 of J. Gorner, and in U.S. Pat. Nos. 4,361,432 and 4,364,765, it is known to make a shaped piece of tempered glass in a two-stage process. In the first stage the normally planar glass sheet, which is heated above its softening or deformation point is bent or deformed into a nonplanar shape, by differential pressure acting against it or by simple mechanical shaping. Then the still-soft shaped sheet is cooled rapidly, with blasts of cool air on its surface to prestress and temper the glass. The surface of such glass is very hard, the glass is very strong, and when broken it disintegrates into small relatively smooth pieces that pose little danger of injury.

The quenching unit is normally an upper and a lower array of nozzles, the upper ones pointing down an the lower ones pointing up. These nozzle assemblies are relatively vertically displaceable, normally with the upper one movable and the lower one stationary. In addition the nozzle assemblies each define a surface corresponding to the respective face of the shaped glass sheet. Thus blasts of quenching air can be directed at the faces of the sheet from very close, making it possible to create in the glass prestresses between the surfaces and interior that give the beneficial qualities of tempered glass.

It is necessary to provide special-duty loading and unloading conveyors for such a system. The loading conveyor moves the hot shaped sheet that is to be tempered into position between the nozzle assemblies. The unloading conveyor takes the quench-tempered shaped sheet out from between the nozzle assemblies and hands it over to a further stage in the manufacturing process.

The above-cited European patent document describes a system wherein the loading conveyor includes an loading ring on which the outer periphery of the workpiece can rest, whereas the unloading conveyor has an unloading ring of similar shape. The loading conveyor manipulates the workpiece into the quenching station, that is between the nozzle assemblies, while holding it in the loading ring. The pressure to the lower nozzle assembly is increased and/or the pressure to the upper nozzle assembly is decreased to lift the workpiece up off the loading conveyor and hold it against the upper assembly. The loading ring can then move out of the station and the unloading ring can swing it, whereupon appropriate pressure changes can drop the sheet back down into the unloading ring.

Such a ring arrangement does not provide sufficient support for the workpiece, so it can deform during the quenching operation. Any deformations can ruin the optical quality of the piece, forcing it to be rejected. In addition the prestressing thus created in the glass is distributed evenly overall, or at least randomly distributed. Such prestressing is undesirable, it generally being agreed that for best fracturing action it is desirable to prestress in a pattern, so that on fracturing when all stresses break up the whole piece the breaking follows a dense pattern.

OBJECTS OF THE INVENTION

It is therefore an object of the present invention to provide an improved system for quench-tempering a hot shaped glass sheet.

Another object is the provision of such a system for quench-tempering a hot shaped glass sheet which overcomes the above-given disadvantages, that is which allows such a sheet to be quenched without deforming and while being prestressed according to a uniform pattern.

A further object is to simplify the conveyor arrangements used in such systems.

SUMMARY OF THE INVENTION

A method of quench-tempering a hot shaped glass sheet according to the invention comprises supporting the sheet in a quenching station underneath a downwardly directed upper nozzle array and above an upwardly directed lower nozzle array by engagement of only a portion of the lower surface of the sheet. The portion engaged for support is interrupted by a generally uniformly distributed array of unsupported regions. An air stream is directed from the lower nozzle array up toward the lower surface of the glass sheet while an opposite air stream is directed down from the upper nozzle array toward the upper surface of the sheet. Generally all of the lower surface of the sheet is shielded except at the unsupported regions from the air stream of the lower nozzle array. A prestress field is thus formed in the sheet which corresponds to the distribution of the unsupported regions.

Since the sheet is supported during the entire operation until it is hard enough to hold its shape, there is no possibility of it deforming. The substantial problem of losing shape before it is tempered is largely eliminated in this manner. In addition, the prestress field in the sheet can be very regularly arranged so that if the sheet is broken it will go into regular pieces. Unsupported and unshielded regions are normally arranged in a uniform array, circular holes in a rectangular array doing the job.

According to this invention the sheet is supported on and shielded by a plate having the same shape as the sheet but formed with holes at the unsupported regions. The sheet is transported into the station prior to quenching therein while supported on the plate and is transported out of the station after quenching therein while still supported on the plate.

To exaggerate the patterned prestressing effect, a respective air substream is directed at each of the unsupported locations and thereby forming the air stream of the lower nozzle array.

According to further features of this invention the sheet and plate have overlying outer peripheries. One of the conveyors at least includes an annular support ring engageable with the outer periphery of the upper surface of the sheet. This ring is provided with clips engageable underneath the outer periphery of the plate for pressing the outer peripheries both up against the support ring. Instead of clip, suction-type holders, can be used to take advantage of the smooth surface being worked with.

DESCRIPTION OF THE DRAWING

The above and other features and advantages will become more readily apparent from the following, reference being made to the accompanying drawing in which.

SPECIFIC DESCRIPTION

Figure 1:
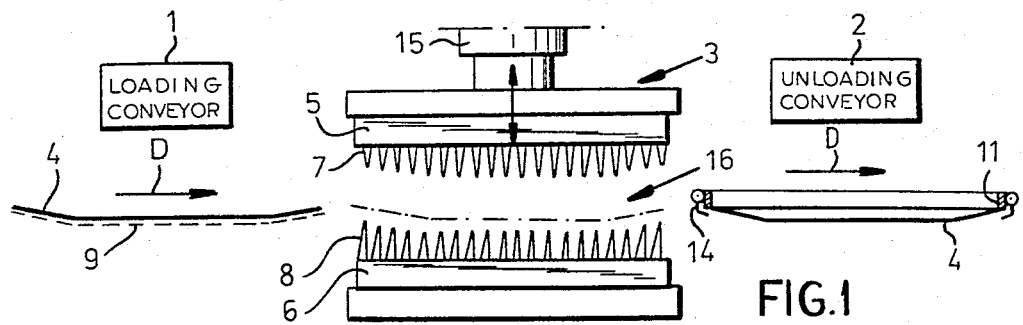
FIG. 1 is a mainly schematic view illustrating the apparatus for carrying out the method of this invention.

As seen in FIG. 1 an apparatus for quench-tempering a hot shaped glass sheet 4 basically comprises a loading device indicated schematically at 1, an unloading device indicated schematically at 2, and a quenching unit 3 lying normally therebetween.

The quenching unit 5 has an upper part 3 vertically displaceable by a cylinder 15 and provided with a downwardly directed array of nozzles 7, and a stationary lower part 6 having an upwardly directed array of nozzles 8. The tips of the nozzles 7 and 8 lie on respective imaginary surfaces that are not planar, but that instead correspond to the shapes of the respective faces of the sheet 4. The lower nozzles 8 at least can be pressurized sufficiently to support the sheet 4. The unit 3 therefore defines a station 16 through which the conveyers 1 and 2 displace the sheet 4 in a direction D.

According to this invention the sheet 4 is supported before and during the quenching operation on a complementarily shaped rigid suport plate 9 formed with an array of throughgoing holes 13 of the same size and distributed fairly uniformly over the plate 9. The edges 10 of the sheet 4 can be secured to the corresponding edges 17 of the plate 9 by vacuum holders or clips 14 carried on an annular support frame 11 that fits down against the top surface of the sheet 4 at the edge 10 thereof. Such peripheral clamping ensures that the critical edges of the workpiece sheet 4 are held in the exact shape they must have, and gravity alone will hold the semiplastic sheet 4 down on the plate 9, insuring that it will retain its shape also. The nozzles 7 and 8 are aligned vertically with each other through respective holes 13 of the plate 9 when the workpiece is properly positioned in the station as shown in FIGS. 2 through 5.

Figure 2:
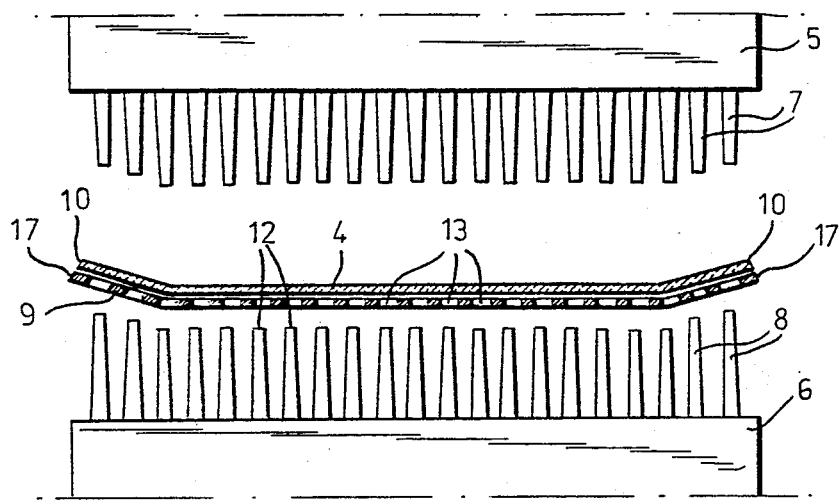
FIG. 2 is a large-scale view of the quenching unit of the apparatus immediately after being loaded.

The system of this invention functions as follows:

The workpiece sheet 4 is either shaped directly on the plate 9 or is deposited thereon upstream of the station 16 immediately after shaping. The loading conveyor 1 then displaces the workpiece 4 and plate 9 into the station 16 as seen in FIG. 2, with the upper nozzle assembly 5 raised.

Figure 3:
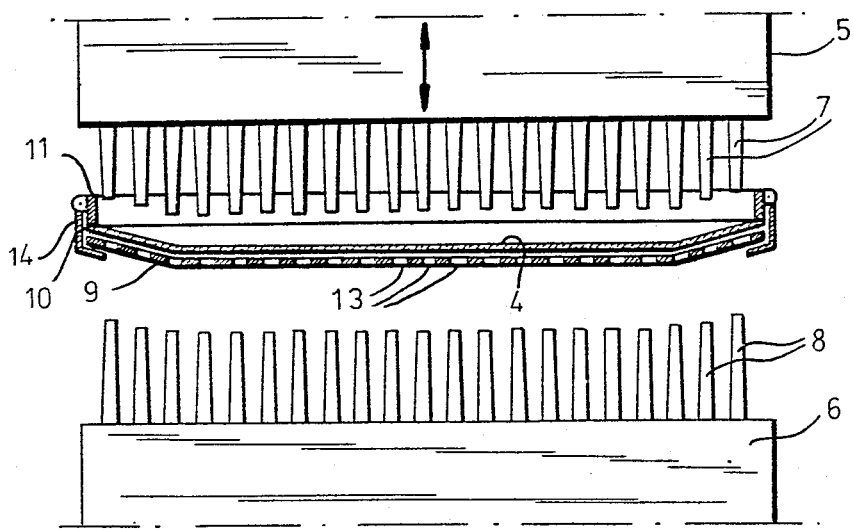
FIGS. 3, 4 and 5 are views like FIG. 2 but showing the unit during three successive further steps in the method of this invention.
Figure 4:
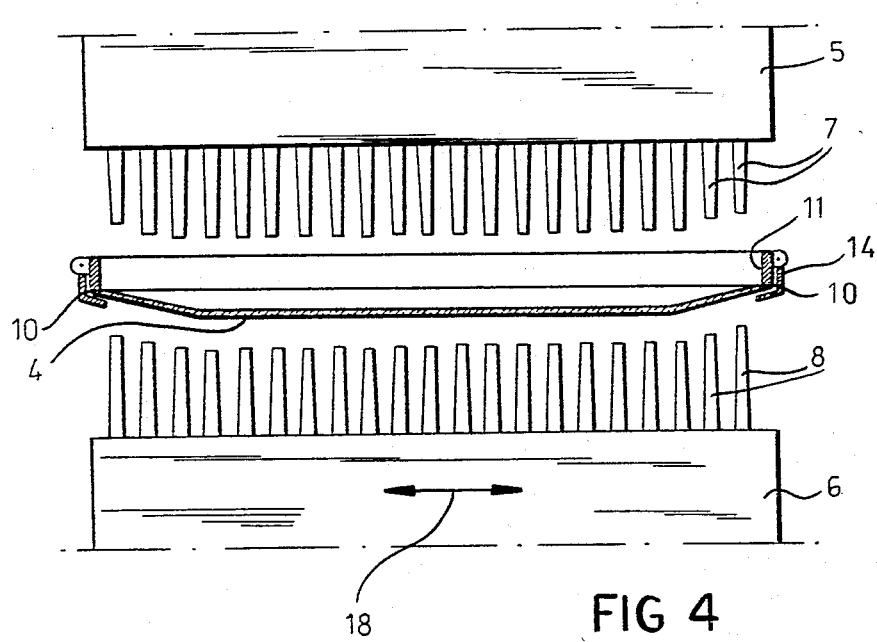

The support ring 11 of the output conveyor 2 is then displaced into the station 16 as shown in FIG. 3, the pressure to the lower nozzles 8 is turned up to press the sheet 4 and plate 9 up against the lower edge of the ring 11, the clips 14 are engaged under the plate edge 17, and the upper assembly 5 is lowered. In this position air streams from the nozzles 7 and 8 play on respective locations of the sheet 4. Since the lower surface of the sheet 4 is shielded by the plate 9 between the holes 13, there will be less prestressing in these regions.

Once the sheet 4 has generally cooled enough that there is no more tempering action, the clips are backed off and the plate 9 is removed slowly, the pressure from the lower nozzles 8 holding the sheet 4 up against the support ring 11. The plate 9 can move back upstream for reuse, and the clips 14 are swung down to lock the sheet 4 in place on the ring 11 again. During this and even the previous action the assembly 6 can be reciprocated horizontally as indicated at 18.

Figure 5:
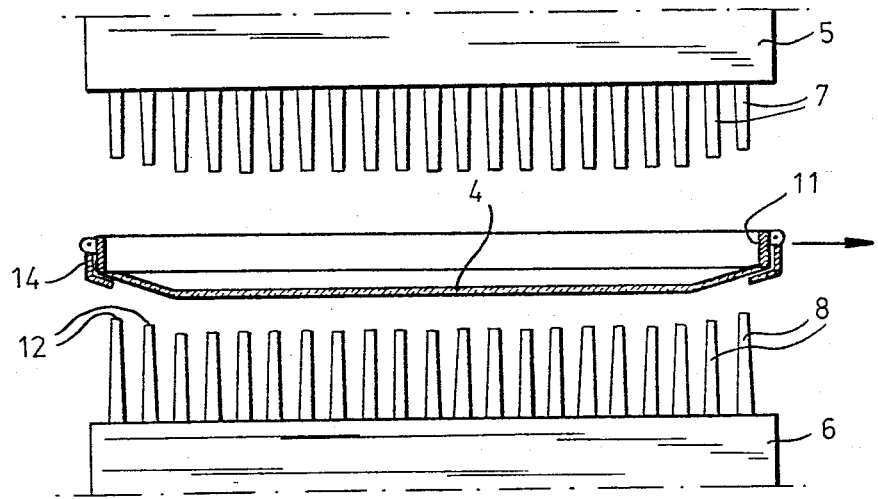

Thereafter as shown in FIG. 5 the upper nozzle box or assembly 6 is moved back up and the ring 11 is moved downstream with the workpiece 4.

The resultant tempered glass sheet will be perfectly shaped, as it is supported during the entire transport operation and right up until the time it is hard enough to no longer change shape. In addition the uniform pattern of prestressing will make it fracture uniformly, into pieces all of the same size and shape.

We claim:

1. A method of quench-tempering a hot shaped glass sheet, the method comprising the steps of:
    transporting the sheet into a quenching station;
    supporting the sheet in the quenching station underneath a downwardly directed upper nozzle array and above an upwardly directed lower nozzle array by engagement of only a portion of the lower surface of the sheet, the portion engaged for support being interrupted by a generally uniformly distributed array of unsupported regions;
    directing an air stream from the lower nozzle array up toward the lower surface of the glass sheet while directing an opposite air stream down from the upper nozzle array toward the upper surface of the sheet;
    shielding generally all of the lower surface of the sheet except the unsupported regions from the air stream of the lower nozzle array, whereby a prestress field is formed in the sheet which corresponds to the distribution of the unsupported regions; and
    thereafter transporting the sheet out of the station, the sheet being held during one of the transporting steps by clipping the sheet outer periphery up against a holding ring having the same shape as the outer periphery of the sheet.

2. The quench-tempering method defined in claim 1 wherein the sheet is supported on and shielded by a plate having the same shape as the sheet but formed with holes at the unsupported regions, the sheet being transported into the station prior to quenching therein while supported on the plate and being transported out of the station after quenching therein while still supported on the plate.

3. The quench-tempering method defined in claim 1, further comprising the step of directing a respective air substream at each of the unsupported locations and thereby forming the air stream of the lower nozzle array.

4. An apparatus for quench-tempering a hot shaped glass sheet having an outer periphery, the apparatus comprising:
    a downwardly directed upper nozzle array;
    an upwardly directed lower nozzle array below the upper array and forming a quenching station therewith;
    a rigid plate having the same shape as the sheet but formed with an array of throughgoing holes and having an outer periphery shaped like the outer periphery of the sheet;

means for supporting the sheet on the plate with the lower face of the sheet being exposed to the lower nozzle array only at the holes in the plate;

means for directing an air stream from the lower nozzle array up toward the lower surface of the glass sheet, whereby a prestress field is formed in the sheet which corresponds to the distribution of the holes in the plate;

loading means for transporting the sheet into the station prior to quenching therein while supported on the plate;

unloading means for transporting the sheet out of the station after quenching therein while still supported on the plate; and one of the means for transporting including an annular support ring engageable with the outer periphery of the upper surface of the sheet, the ring being provided with clips engageable underneath the outer periphery of the plate for pressing the outer peripheries both up against the support ring.

5. The quench-tempering apparatus defined in claim 4, further comprising means for horizontally reciprocating one of the nozzle arrays.

* * * * *